United States Patent

[11] 3,574,422

[72] Inventors Harold E. G. Arneson;
Theodore J. Arneson, Jr., Minneapolis, Minn.; John H. Whitmore, Binghamton, N.Y.
[21] Appl. No. 840,943
[22] Filed July 11, 1969
[45] Patented Apr. 13, 1971
[73] Assignees Harold E. G. Arneson
Minneapolis, Minn.;
Theodore J. Arneson, Jr.
South Minneapolis, Minn.

[54] EXTERNALLY PRESSURIZED INTERMEDIATE ROTOR STRUCTURE
7 Claims, 5 Drawing Figs.

[52] U.S. Cl. .................................................. 308/9
[51] Int. Cl. ................................................... F16c 17/16
[50] Field of Search .......................................... 308/9, 122, 121 (A)

[56] References Cited
UNITED STATES PATENTS
3,451,394  11/1967  Hooker .......................... 308/9

*Primary Examiner*—Fred C. Mattern, Jr.
*Assistant Examiner*—Frank Susko
*Attorney*—Reif and Gregory ABSTRACT: An externally pressurized self-compensating bearing structure consisting of a rotor intermediate an internal and an external stator having a common axis therewith, said rotor having a restrictive clearance with respect to said internal stator and an initially lesser restrictive clearance with respect to said external stator, means supplying pressurized fluid through said stators to said clearances whereby in operation said rotor by centrifugal expansion rows to increase said first-mentioned clearance beyond a suitable working clearance and to reduce said second-mentioned clearance to a suitable working clearance.

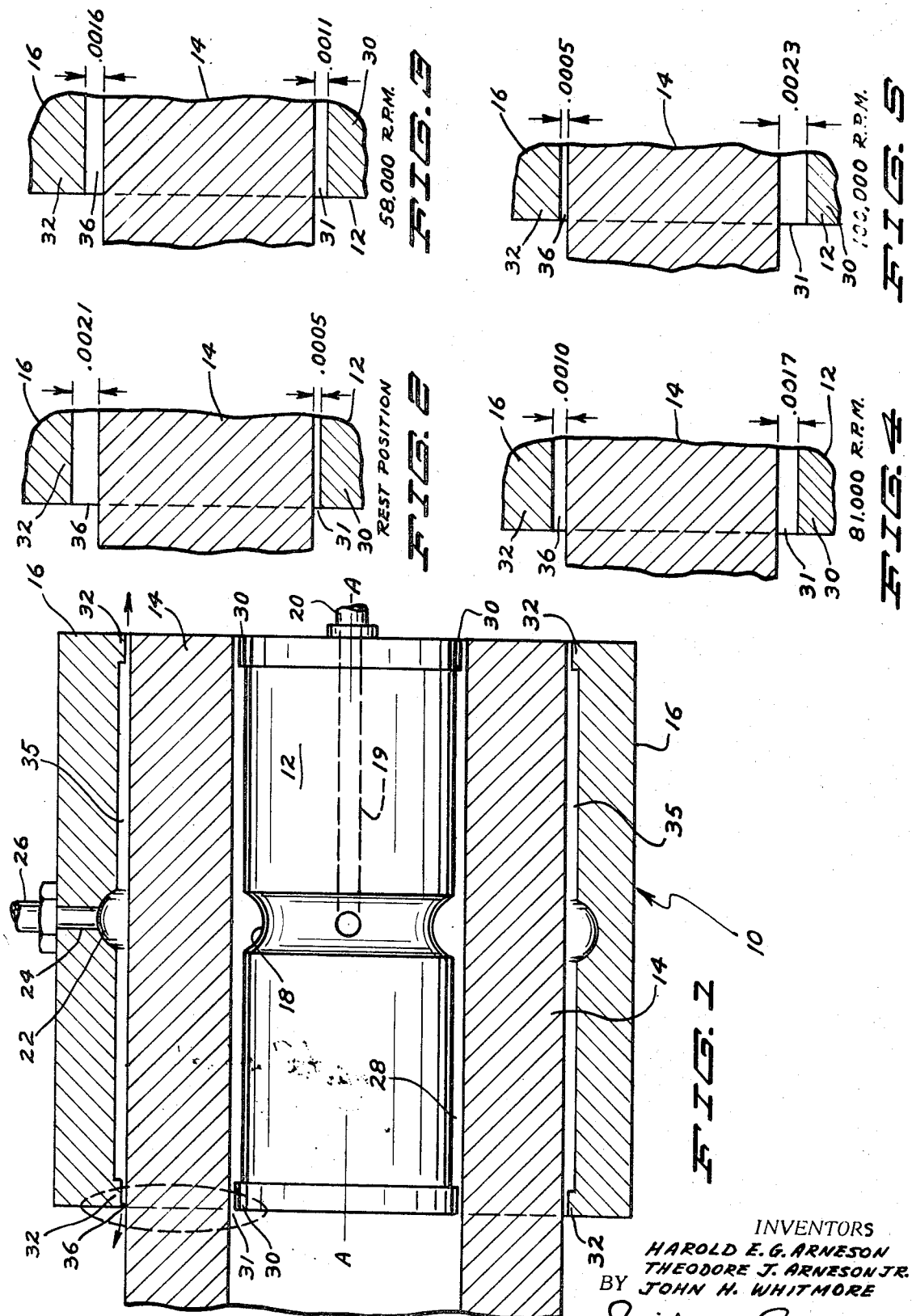

EXTERNALLY PRESSURIZED INTERMEDIATE ROTOR STRUCTURE

BACKGROUND AND SUMMARY OF THE INVENTION

This invention relates to a new and useful improvement in an externally pressurized self-compensating bearing structure arranged and constructed to accommodate the change in clearance resulting from the growth of the rotor due to centrifugal expansion.

The centrifugal expansion of a rotor increases directly with the cube of its diameter and has a square function with respect to its rate of speed. Hence a rotor supported by a stator must be operated within certain specific limits of speed to maintain its clearance within a workable range with respect to its supporting stator.

High-rotor speeds are attainable with the use of a small rotor such as is used in a dental drill and can be suitably supported by a single stator because the growth of the rotor through centrifugal expansion is negligible and therefore a suitable working clearance can be maintained over its full speed range.

The effect of centrifugal expansion is significant however with respect to relatively large rotors. As a representative example, in the case of a rotor having an external radius of 1 inch as in the case of the embodiment of the invention herein illustrated and described, there will be an increase in radial clearance of 0.0018 inch resulting from the growth of said rotor in going from rest to a speed of 100,000 r.p.m.

The acceptable range of clearance will depend upon the initial clearance that is chosen in the design of the bearing. It has been found that a ratio of 3½:1 between the initial clearance and the extent to which it may be increased represents an extreme operating condition, that is, if an initial radial clearance of 0.0005 inch is chosen, then the compensating device of the bearing structure can be so designed that the bearing will provide reasonably good support over the range of radial clearance from 0.0005 inch to 0.00175 inch.

The upper limit of clearance in which adequate support would be provided for the rotor above described by an internal stator would be on the order of an increase of 0.00125 inch from an initial clearance at rest on the order of 0.0005 inch. Hence it is seen that said rotor will grow beyond the point at which support may be provided by an internal stator.

Thus to utilize a rotor of a substantial diameter and provide support for it at low or moderate speeds as well as at a high rate of speed, the invention herein, generally stated, embodies the use of a stator externally of a rotor together with a stator internally of said rotor, all having a common axis. The initial radial clearance between the rotor and the external stator will be such as to accommodate the growth of the rotor with respect to its desired maximum operating speed and to provide a desirable operating clearance at such speed. The internal stator will be arranged to provide suitable radial clearance for an initial and moderate operating speed of said rotor.

The invention herein relates to a bearing structure arranged and adapted to provide a substantial range of speed for the satisfactory operation of a rotor of substantial size such as of the size indicated.

The invention herein also relates to a bearing structure arranged and adapted to provide optimum working clearances at relatively low- and at relatively high-operating speeds and also provides for an operating range therebetween of suitable working clearances.

These and other objects and advantages of the invention will be set forth in the following description made in connection with the accompanying drawings in which like reference characters refer to similar parts throughout the several views and in which:

FIG. 1 is a view for the most part in longitudinal vertical section with portions thereof being broken away; and FIGS. 2—5 are enlarged broken views taken at the encircled area of FIG. 1 showing details of the restricted clearance through progressive changes with the clearance being disproportionately magnified.

DESCRIPTION OF A PREFERRED EMBODIMENT

It will be understood that an externally pressurized self-compensating bearing structure may take on various specific forms. Such bearing structures may comprise the use of fluid permeable or foraminoux walls, the use of orifices, annular supply chambers for the fluid supply and tapered passages, steps or lands and grooves or flutes to form restrictive passages to provide a pressure drop for the self-centering action of the rotor.

The invention herein is applicable to said various specific types of bearing structures and provides for the use of said bearing structures through an extended range of rotor speeds with respect to rotors of substantial size.

Referring to FIG. 1, a diagrammatic showing is made of a bearing structure representing one embodiment of the subject matter of the invention herein. It is believed that sufficient structure is shown for a full disclosure of the invention. Elements to place the shown structure in a specific working application would be a matter of conventional design. The structure is indicated generally by the reference numeral 10 and comprises a cylindrical internal stator 12.

Disposed about said internal stator is a cylindrical rotor 14 with an extended end portion thereof being shown broken away, and disposed about said rotor is an external stator 16. Said rotor and said stators have a common axis A. For purposes herein, said rotor may be regarded as having an outer radius of 1 inch and an inner radius of 0.7 inch which represents a fairly large-sized rotor. It will be assumed that the rotor herein is formed of aluminum. All reference to clearance hereinafter refers to radial clearance.

As above indicated, bearing fluid may be provided in the structure in various ways. Here, said stator 12 is shown having a central annular supply channel 18 thereabout from which runs an axial passage 19 to an external supply line 20 which communicates with a suitable pressurized supply of fluid. Said channel 18 will supply fluid to the annular passage 28 formed between its outer surface and the adjacent surface of said rotor 14.

Said stator 16 is shown having an internal annular supply channel 22 having a radial passage 24 running to an external supply line 26 which communicates with a suitable supply of pressurized fluid. Said supply channel 22 provides fluid to the passage 35 formed between its annular surface and the adjacent outer surface of said rotor 14.

In the present embodiment, steps or lands are shown in FIG. 1 as one means of restricting the clearance of the passages between the rotor and the adjacent stators for the purpose of creating a centering force.

Said stator 12 is shown having annular steps 30 about either end portion thereof and the stator 16 is shown having internal annular steps 32 adjacent either end thereof.

With the bearing structure 10 at rest or stopped, the restrictive clearance portions 31 of the passage 28 at the steps 30 will be a suitable minimum working clearance adequate for support of the rotor 14 by said stator 12, such as on the order of 0.0005 inch. The restrictive clearance portions 36 of the initial clearance of the passage 35 at the steps 32 is on the order of 0.0021 inch. The height of the steps will be a matter of known bearing design.

Reference is now had to FIGS. 2—5 in which diagrammatically is shown the radial growth of the rotor at various rates of speed and the accommodation at the steps 30 and 32 of the restrictive portions 31 and 36 of clearance of the passages 28 and 35 to said growth to maintain support of the rotor for which purpose the stator 12 initially provides support and at the highest rate of speed thereof, the stator 16 provides support. Through the intermediate stages of rotor speed, said stators cooperate in varying degrees.

FIG. 2 indicates the condition of restrictive clearance with the bearing structure at rest. Here 0.0005 inch of clearance are indicated at 31 as a good working clearance for support of the rotor by the stator 12 at initial and moderate operating speeds. The growth of the rotor results from its centrifugal expansion. As previously stated, said expansion varies with the cube of the radius of the rotor and with the square of its speed. This is known in the art.

In FIG. 3, it is assumed that the rotor is being driven at approximately 58,000 r.p.m. The growth of the rotor has been sufficient to increase the clearance with the internal stator 12 from 0.0005 inch to 0.0011 inch and the clearance between the rotor and the stator 16 has been reduced from 0.0021 inch to 0.0016 inch. The inner stator 12 continues to contribute to the support of the rotor and the external stator 16 is assuming part of the support of said rotor. This may be regarded as an intermediate speed range.

In FIG. 4 at a rotor speed of approximately 81,000 r.p.m., the clearance 31 has been increased to 0.0017 inch and the clearance 36 has been reduced to 0.0010 inch. The inner stator is contributing less rotor support and the external stator 16 is providing substantially more of the rotor support. There has been a radial growth of the rotor of 0.0012 inch with respect to the stator 31.

In FIG. 5, the rotor is indicated as operating at its desired maximum speed of approximately 100,000 r.p.m. with substantially all of the support of the rotor being provided by the external stator 16 with its restrictive clearance being reduced to 0.0005 inch. At this rate of speed, the rotor has had an internal radial growth of 0.0018 inch with respect to the stator 12 and an external radial growth of 0.0016 inch with respect to the external stator 16. It is noted that the radial growth at the bore of the rotor is not identical with the exterior radial growth of the rotor, however, this difference may be disregarded for purposes herein.

It is quite obvious that a conventional bearing structure comprising a rotor and an internal stator would be limited to an upper speed on the order of 81,000 r.p.m. where any significant bearing stiffness is required, in view of the workable range of clearance extending to 3½ times the initial clearance with respect to the structure described and as hereinbefore set forth. The structure disclosed and described therefore herein extends the useful range of operating speed of the rotor to a substantially greater speed by the addition of an external rotor.

We claim:

1. An externally pressurized self-compensating bearing structure having in combination:
    a cylindrical rotor;
    a stator internally of said rotor;
    a second stator externally of said rotor;
    said rotor and said stators having a common axis;
    said rotor and said internal stator forming and annular clearance therebetween of such restriction as to provide for the self-centering action of said rotor;
    said rotor and said external stator forming an annular clearance therebetween of less restriction than that of said first mentioned clearance.

2. The structure set forth in claim 1, wherein said second-mentioned annular clearance is of such extent as to be substantially one-fourth as restrictive as said first-mentioned annular clearance.

3. The structure set forth in claim 1, wherein said second-mentioned annular clearance is of such extent as to be reduced by the growth of said rotor in being driven at its highest rate of operating speed, to be substantially as restrictive as said first-mentioned annular clearance.

4. The structure set forth in claim 1, wherein said rotor and said respective stators are arranged and constructed to form said clearances therebetween to have such restriction as to form singly and cooperatively a range of working clearances to provide for the self-centering action of said rotor to accommodate the growth of said rotor from rest to its highest rate of operating speed.

5. The structure set forth in claim 1, including means supplying pressurized fluid to said clearances.

6. The structure set forth in claim 1, including means supplying pressurized fluid separately to said clearances.

7. The structure set forth in claim 1, wherein:
    said stators have fluid supply passages running to their respective clearances; and
    means connecting said fluid supply passages with a pressurized fluid supply.